Feb. 23, 1926.                                                                                1,574,709
L. D. SOUBIER
APPARATUS FOR DELIVERING CHARGES OF MOLTEN GLASS
Filed Dec. 20, 1920                5 Sheets-Sheet 1
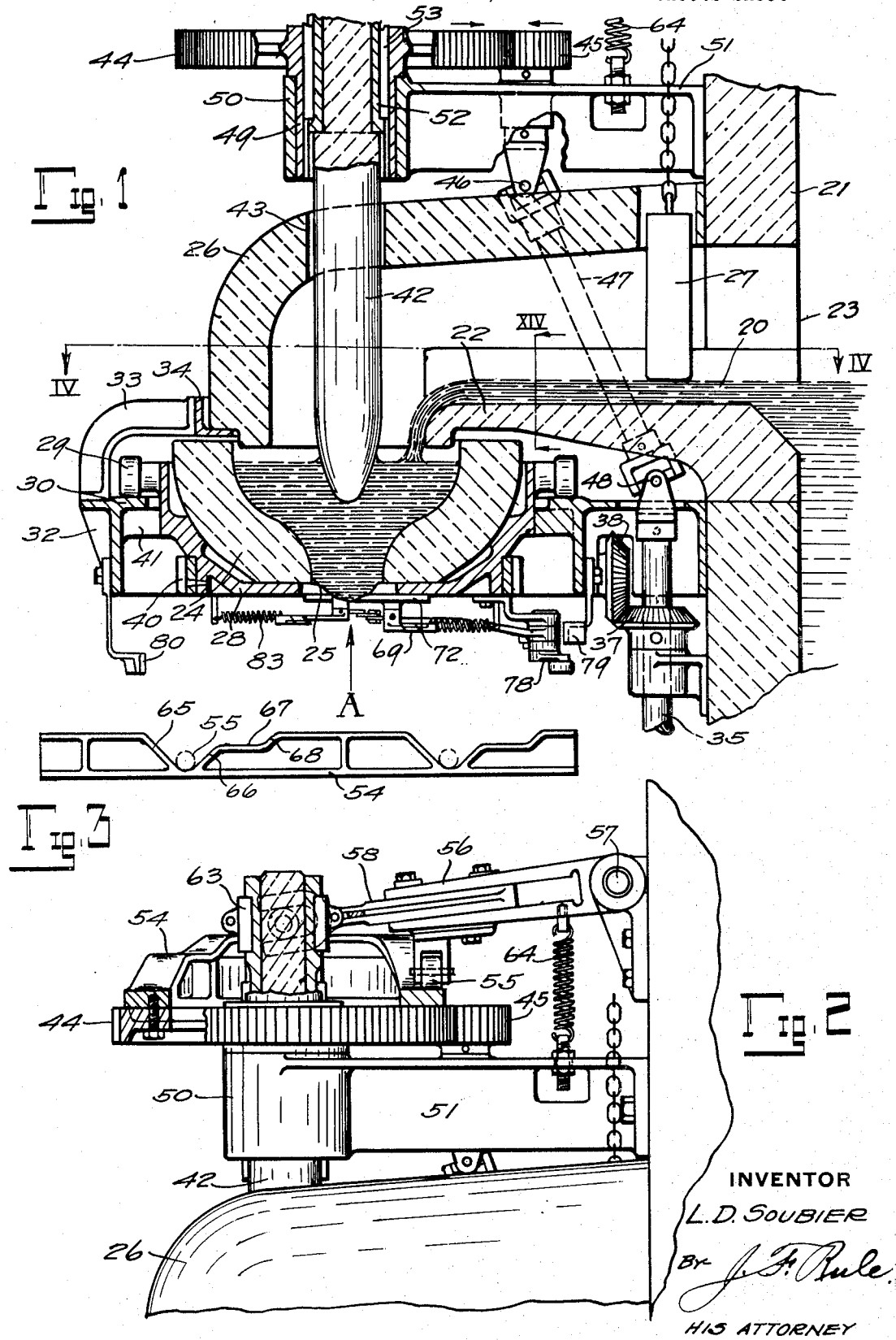
INVENTOR
L. D. SOUBIER
By J. F. Rule
HIS ATTORNEY Feb. 23, 1926.　　　　　　　　　　　　　　1,574,709
L. D. SOUBIER
APPARATUS FOR DELIVERING CHARGES OF MOLTEN GLASS
Filed Dec. 20, 1920　　　5 Sheets-Sheet 2

INVENTOR
L. D. SOUBIER
BY J. F. Rule.
HIS ATTORNEY

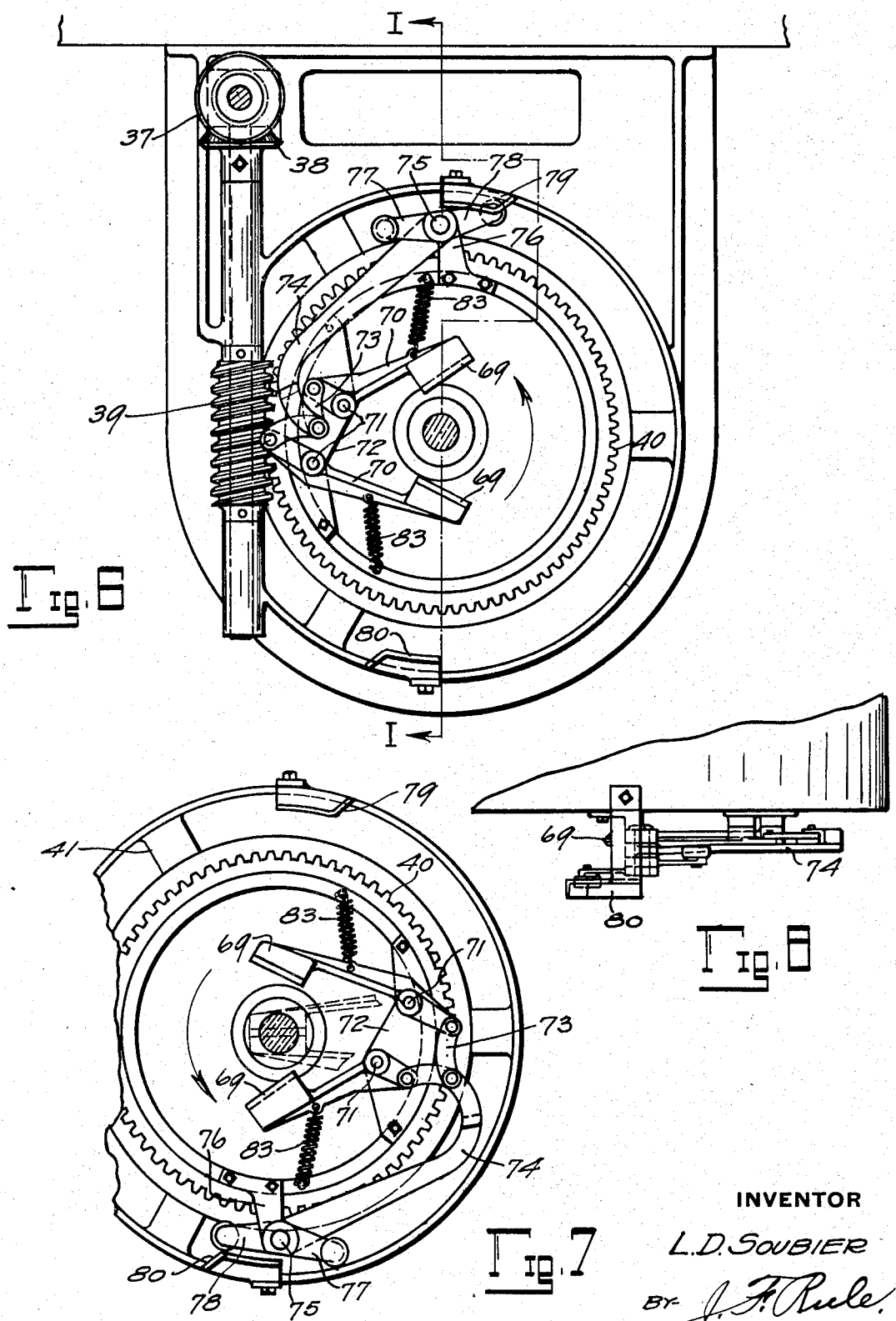

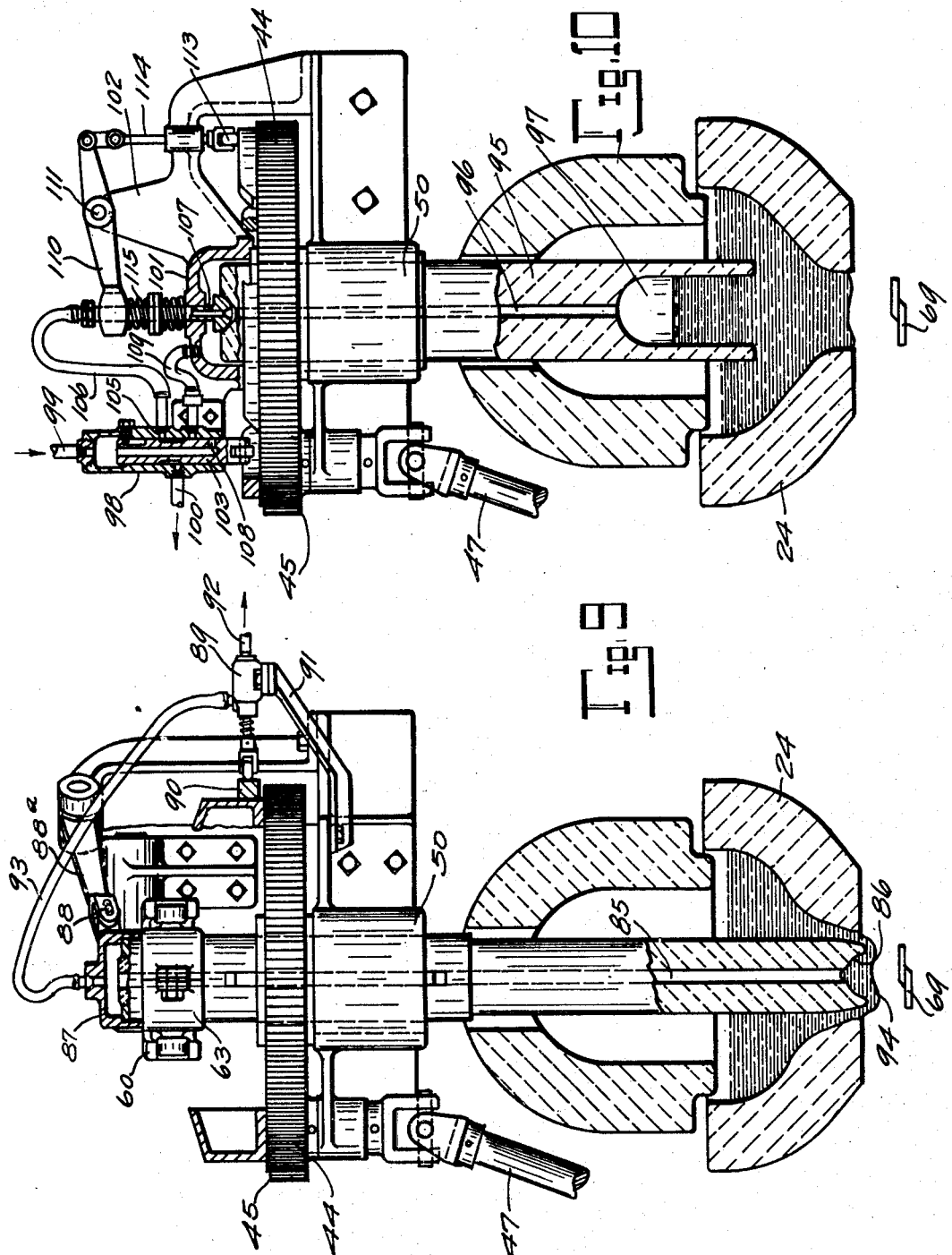

Feb. 23, 1926.                                                              1,574,709
L. D. SOUBIER
APPARATUS FOR DELIVERING CHARGES OF MOLTEN GLASS
Filed Dec. 20, 1920        5 Sheets-Sheet 5

INVENTOR
L. D. Soubier
BY J. F. Rule
HIS ATTORNEY

Patented Feb. 23, 1926.

1,574,709

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

APPARATUS FOR DELIVERING CHARGES OF MOLTEN GLASS.

Application filed December 20, 1920. Serial No. 431,847.

*To all whom it may concern:*

Be it known that I, LEONARD D. SOUBIER, a citizen of the United States, residing at Toledo, in the county of Lucas and State of Ohio, have invented new and useful Improvements in Apparatus for Delivering Charges of Molten Glass, of which the following is a specification.

My invention relates to apparatus by means of which molten glass is delivered from a melting tank or container and formed into individual masses or gobs of a size and shape suitable for entering the molds of a glass forming machine.

In the present state of the art it is the practice to flow the glass from the body of the tank into a boot or extension or other receptacle located externally of the tank and provided with an outlet orifice in the bottom thereof through which the glass issues. The flow of glass is controlled by some regulating device such as a plug reciprocating vertically in the glass above the outlet, whereby it is discharged in formed masses or gobs which are periodically severed at a point beneath the outlet.

In apparatus of this character difficulty has been experienced on account of a lack of uniformity of temperature of the glass surrounding the regulator. This is due to the fact that there is a tendency for the glass at the side of the regulator next to the furnace to flow more freely through the discharge outlet than the glass on the side of the regulator remote from the furnace which has a more circuitous path and is subject to greater cooling influences. As a result, the flow of glass from the side of the orifice remote from the furnace is slower and consists of colder glass than that adjacent the furnace, resulting in a charge or gob which is not symmetrical or of uniform temperature on both sides, and which is also more or less distorted in shape. This lack of uniformity and symmetry is reflected in the articles blown or produced from the charges, the quality of which is thereby lowered.

Expedients which have heretofore been tried to overcome the above difficulty, as, for example, a wall or float for dividing the flow and directing it to opposite sides of the outlet orifice, reheating burners, etc., have not proved entirely satisfactory or effective.

An object of the present invention is to overcome the above objections and for this purpose means are provided for causing a rotary movement of either the receptacle, into which the glass flows from the furnace, or the regulator, or both, whereby a one sided cooling is prevented and a symmetrical flow is obtained.

Other objects of the invention will appear hereinafter.

In the accompanying drawings:

Figure 1 is a sectional elevation of an apparatus constructed in accordance with the principles of my invention, parts being broken away.

Figure 2 is a similar view of the upper portion of the apparatus.

Figure 3 is a development of the cam by which the regulating plug is reciprocated.

Figure 6 is a bottom plan view of the apparatus as indicated by the arrow A on Figure 1.

Figure 7 is a similar view, but with the charger and cutting apparatus rotated to a different position.

Figure 8 is a side elevation of the cutting apparatus.

Figure 9 is a part sectional elevation of a modified construction in which a hollow plunger or regulator is employed together with means for periodically producing a partial vacuum therein.

Figure 10 is a part sectional elevation of a further modification in which alternate air pressure and vacuum are applied in the hollow regulator, and in which the regulator is rotated, but not reciprocated.

Figure 4:
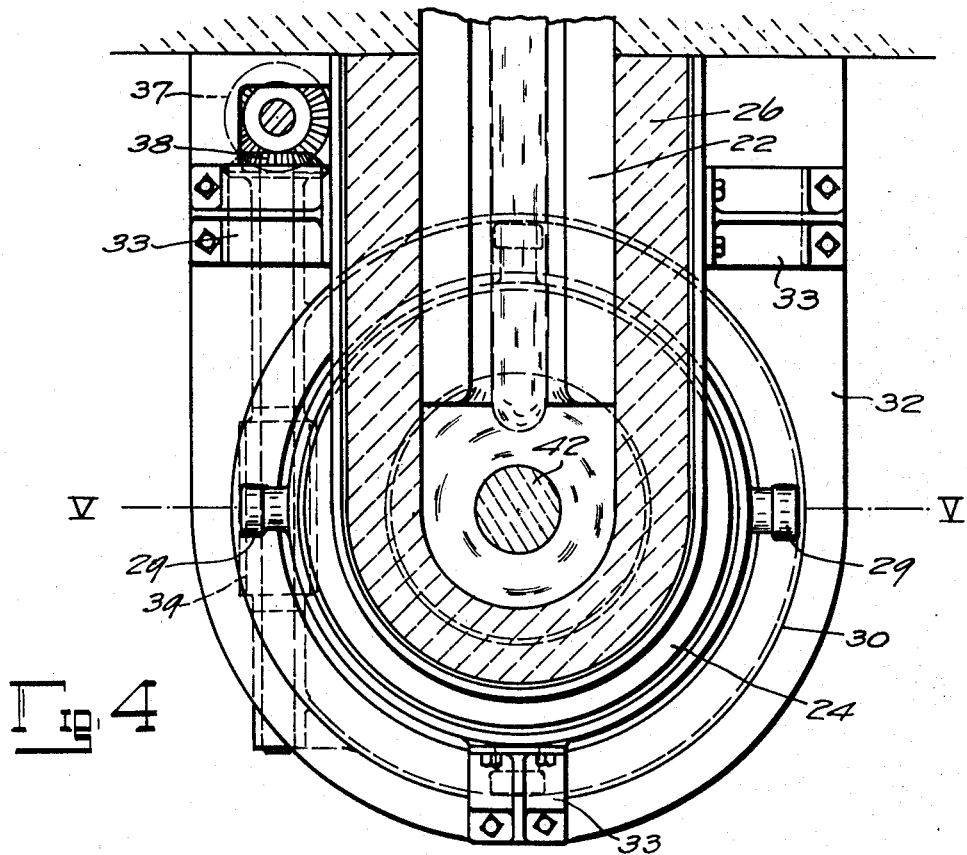
Figure 4 is a sectional plan at the line IV—IV on Figure 1.
Figure 5:
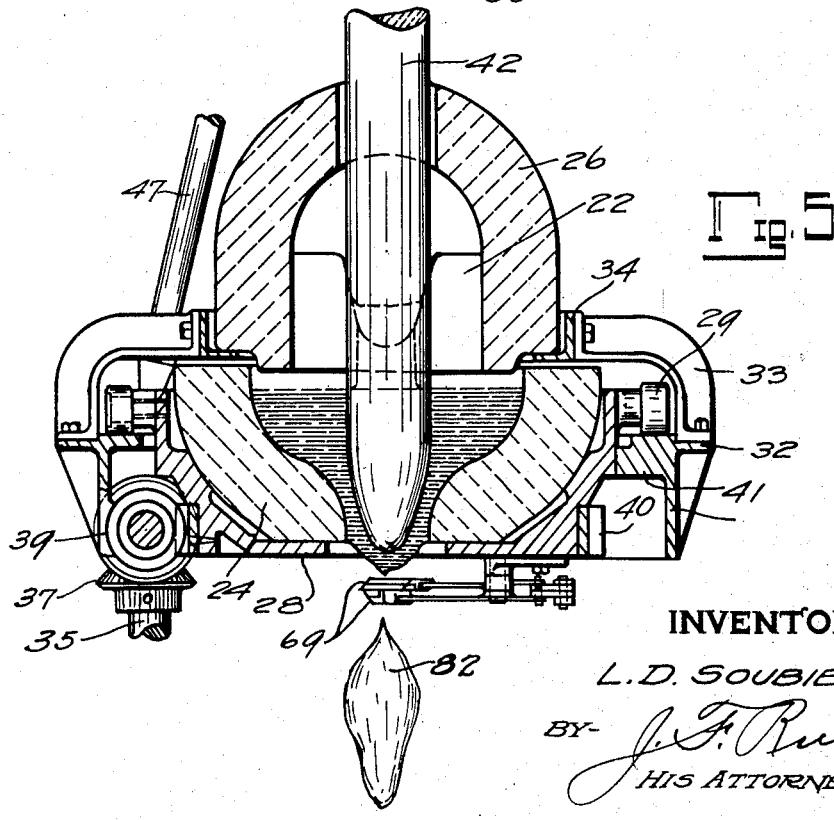
Figure 5 is a sectional elevation at the line V—V on Figure 4.

Referring particularly to Figures 1 and 2, the molten glass 20 is supplied from a continuous melting tank 21 or other container and permitted to flow through a spout 22 extending laterally from an opening 23 in the side wall of the furnace. A cup or receptacle 24, which may be termed a charger, is positioned at the outer end of the trough to receive the glass and is provided with an outlet orifice 25 in the bottom thereof, through which the glass issues. A hood 26 is arranged over the spout and charger to retain the heat and prevent undue chilling of the glass. The flow of glass through the spout may be regulated by a gate valve 27 projecting into the spout and adjustable up and down therein. The charger, spout, hood and gate valve may all be made of fire clay or other refractory material. The charger 24 is mounted for continuous rotation about the vertical axis of the orifice 25 and for the this purpose is supported in a bracket or frame 28 which may be an iron casting provided with rolls 29 to run on a circular track 30. This track is formed on a stationary frame 32 which may be the main supporting frame for the apparatus. Brackets 33 (see also Figs. 4 and 5) are secured to the frame 32 and carry a frame 34 which forms a support for the hood 26.

The means for rotating the charger 24 comprises a continuously rotating vertical drive shaft 35 connected to any suitable source of driving power. A bevel gear 37 on the shaft 35 meshes with a gear 38 on a horizontal shaft carrying a worm 39 (Fig. 6) running in mesh with an annular worm gear 40 fixed to the frame 28. The latter is guided in its rotative movements by bearing lugs 41 formed on the frame 32.

Figure 12:
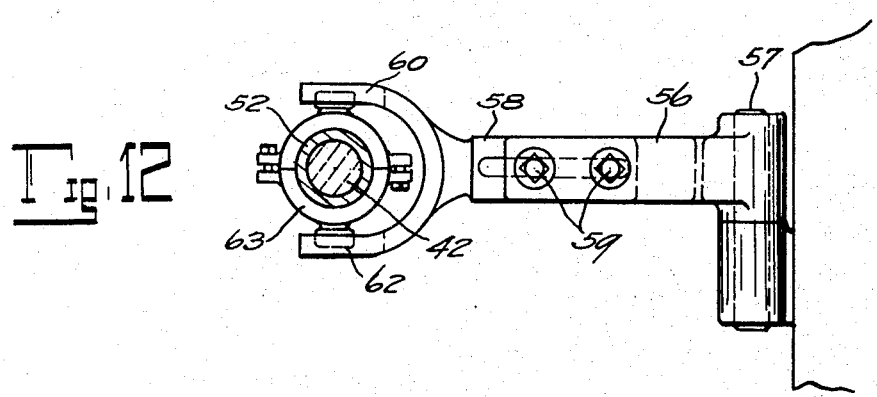
Figure 12 is a detail plan showing an arm for reciprocating the regulator.

The discharge of glass through the orifice 25 is regulated and controlled by a suitable regulator which, as shown in Figures 1 to 5, comprises a vertical clay plug 42 projecting downward through an opening 43 in the hood 26, the lower end of the plug being projected into the glass in the charger. This regulator is mounted to reciprocate vertically and provision is also made for rotating it, preferably at the same angular speed as the charger. The regulator is rotated by means of a gear wheel 44 driven by a pinion 45, the shaft of which has a universal joint connection 46 with a coupling rod 47 connected by a universal joint 48 to the drive shaft 35. The hub 49 of the gear wheel 44 is journaled in a sleeve 50 formed on a supporting bracket 51. A metal sleeve 52 is fixed to the plug 42 and carries keys 53 slidable in keyways formed in the hub 49, permitting the plug to reciprocate vertically in the gear hub which provides a driving connection between the gear and plug for rotating the latter. The regulator is reciprocated by means of a cam 54 (see Figs. 2 and 3) on which runs a cam roll 55 carried by an arm 56 (Figs. 2 and 12) mounted to rock up and down about a pivot 57. The arm 56 comprises a section 58 adjustable lengthwise of the arm and held in adjusted position by locking bolts 59. The outer end of the arm terminates in a yoke 60 having bifurcated ends to receive the rolls or lugs 62 on a ring or collar 63 seated in an annular recess formed in the sleeve 52. The roll 55 is held against its cam by a spring 64. The cam is so formed as to cause two reciprocations of the regulator during each complete rotation of the charger. By referring to Figure 3, it will be seen that as the cam advances from right to left, the roll 55 will move down the incline 65, thereby quickly lowering the regulator. The roll is then moved upward by the incline 66 whereby the regulator is moved upward to an intermediate position at which it remains stationary while the roll is traversed by the rest portion 67 of the cam. The regulator is then lifted further to its uppermost position by the incline 68, thereby completing its cycle of movements. The regulator during its downward movement exerts a downward pressure on the glass, thereby assisting in rapidly expelling a gob or column of glass. As the regulator moves upward it exerts a retarding action or upward pull on the glass as the latter adheres to the plug, so that the downward movement of the glass is retarded or interrupted and in some instances may be given a slight upward movement.

The charges of glass are severed by a pair of shears operating periodically in synchronism with the movements of the regulator. Referring particularly to Figures 1, 6, 7 and 8, the cutting mechanism comprises a pair of shear blades 69 carried on arms 70 connected by pivots at 71 to a bracket 72 on the bottom of the rotating frame 28. The lever arms 70 are actuated by toggle links 73 to which is connected an actuating lever 74 fixed to a rock shaft 75 journalled in a bracket 76 on the rotating charger frame 28. Rock arms 77 and 78 are actuated respectively by stationary cams 79 and 80. Referring to Figure 7, it will be seen that the arm 78 has just been swung inward toward the center of the charger by the cam 80 so that the arm 74 has been swung to its outermost position and holds the blades 69 separated. The outward swinging movement of the arm 74 moves the toggle links 73 from the Figure 6 position to the Figure 7 position, during which movement the toggle is first straightened, thereby bringing the shear blades together, as shown in dotted lines in Figure 7, and immediately separating said blades as the toggle links continue their movement to the Figure 7 position. It will thus be seen that the cam 80 operates to impart a quick opening and closing movement to the shears. As the cutter mechanism approaches the Figure 6 position, the arm 77 is actuated by the cam 79, thereby returning the arm 74 to its inward position, thus again closing and opening the shears. The shear mechanism may be timed to operate while the regulator 42 is in its downward position or shortly after it has commenced its upward movement. Each operation of the shears severs a charge or gob of glass 82 (Fig. 5) and permits it to drop or be transferred to a forming mold. Springs 83 connected to the shear arms assist in effecting a quick opening movement of the shear blades.

The rotary movement of the charger causes an even distribution around the regulator, of the glass flowing into the charger, and prevents a one sided cooling of the glass in the charger. The flow of glass through the orifice 25, therefore, is symmetrical and the temperature is the same on all sides. The rotation of the regulator at the same peripheral speed as the charger prevents any spiral or twisting action of the charger in the glass. Satisfactory results, however, may be obtained under some working conditions without rotating the regulator. Also, in some instances the rotation of the regulator might serve to distribute the movement of the glass without any rotation of the charger.

Figure 11:
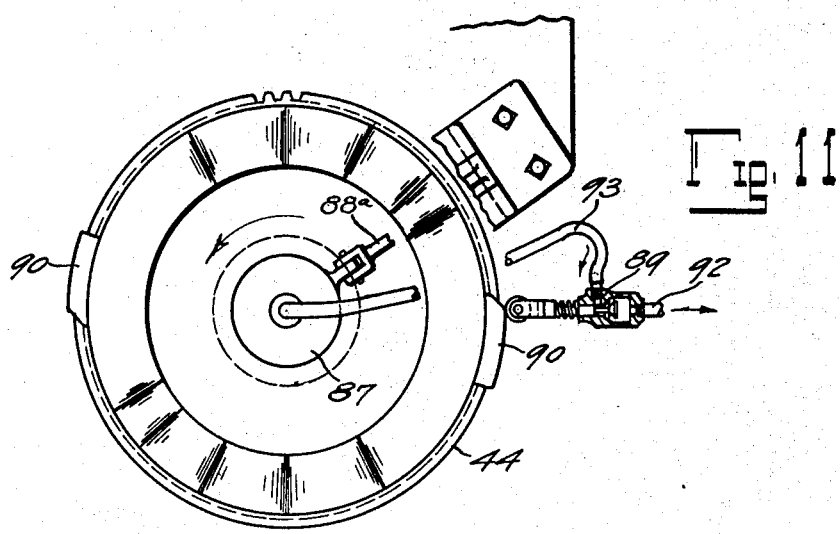
Figure 11 is a partly diagrammatic plan view of mechanism shown in Figure 9, particularly the cams for reciprocating the regulator and for controlling the vacuum.

Figures 9 and 11 illustrate a modification in which the charger is formed with a central bore or passageway 85 extending throughout its length and terminating at its lower end in a cup cavity 86. A non-rotating cap 87 is mounted on the upper end of the regulator and has a pivotal connection 88 with an arm 88ª by which the cap is held against rotation while the regulator is reciprocated and rotated. The passageway 85 is periodically connected to a source of partial vacuum by means of a valve 89 actuated by stationary cams 90. The valve 89 is carried on a stationary bracket 91. Each cam 90 operates in turn to open the valve and thereby establish communication between a pipe 92 leading to a source of vacuum and a pipe 93 leading to the cap 87. The cams 90 are preferably timed to operate the valve and apply the vacuum about the time the cutter blades operate. The vacuum serves to retard the flow of glass and after the gob has been severed to draw the remaining stub end 94 upward into the cup 86, as indicated in Figure 9.

Figures 13, 14:
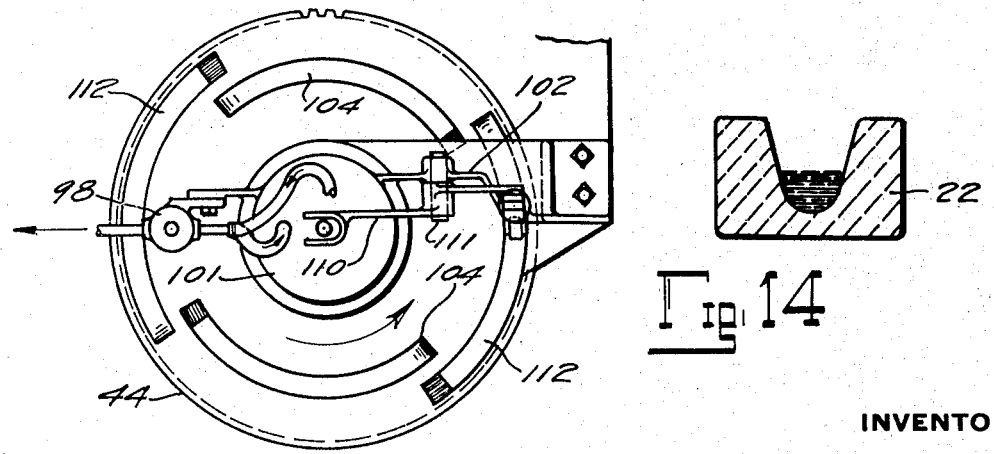
Figure 13 is a diagrammatic plan view of the cams for operating the valves of the Figure 10 construction.
Figure 14 is a section at the line XIV on Figure 1, showing the trough.

Figures 10 and 13 illustrate a further modification in which the regulator 95 is not reciprocated, but controls the flow of glass by means of air pressure and vacuum alternately applied through the passageway 96 extending lengthwise through the regulator. This passageway terminates at its lower end in a cup cavity 97. The supply of air and vacuum are controlled by a valve 98 from which lead pipes 99 and 100 connected respectively to the air pressure supply and vacuum tank. The valve casing is connected to a stationary cap 101 enclosing the upper end of the regulator 95, said cap being formed on a stationary bracket 102. The valve piston 103 is reciprocated vertically by cams 104 on the gear wheel 44. With the valve piston lowered, as shown in Figure 10, the vacuum pipe 100 is in communication through a port 105 with a pipe 106 connected with the upper end of a hollow valve stem 107, the lower end of which terminates in a valve seated on the upper end of the regulator. Air is, therefore, exhausted from the cup 97, causing the glass to rise therein, as indicated. When the valve piston 103 is lifted by its cam, the vacuum connection is cut off and a port 108 in said piston opens a pipe 109 to the pressure pipe 99. The pipe 109 communicates with the interior of the cap 101 so that air pressure is supplied therein. In order to permit this air pressure to be transmitted downward through the charger, the valve stem 107 is lifted by means of a lever 110 pivoted at 111 to the bracket 102, said lever being controlled by stationary cams 112 on which runs a roll 113 on a vertical stem 114 connected to the lever 110. A spring 115 operates the lever 110 and lifts the valve stem 107 when the roll 113 runs off its cam, thereby supplying air pressure within the chamber 97, as above noted. The air pressure exerts an expelling force on the glass and assists in quickly expelling a mass or gob of suitable form. This gob is then severed and the flow of glass then temporarily retarded or interrupted by applying vacuum in the manner already explained. It will be understood that the charger 24 in Figures 9 and 10 may be rotated in the same manner as heretofore explained in connection with the construction shown in Figures 1 and 2.

Modifications may be resorted to within the spirit and scope of my invention.

What I claim is:

1. The combination of a container for molten glass having a discharge opening, means to rotate the container, means to supply glass thereto, a regulator working in the glass in the container and controlling the discharge through said opening, and means to rotate said regulator.

2. The combination of a container for molten glass having a discharge opening, means to rotate the container, means to supply glass thereto, a regulator working in the glass in the container and controlling the discharge through said opening, and means to rotate and periodically reciprocate said regulator.

3. The combination of a container for molten glass having an outlet opening in the bottom thereof, means to supply molten glass to said container, a regulator extending into the glass above said opening, means cooperating with the regulator to control the discharge, and means to rotate the container and regulator.

4. The combination of a container for molten glass having an outlet opening in the bottom thereof, means to supply molten glass to said container, a regulator extending into the glass above said opening, means cooperating with the regulator to control the discharge, means to rotate the container and regulator about the axis of said opening, and means to periodically sever the glass at a point below said outlet.

5. The combination with a receptacle to contain molten glass having an outlet opening in the bottom thereof, means to flow molten glass into said receptacle, a vertically reciprocating regulator arranged over said outlet and projecting into the glass in the receptacle, and means to rotate said receptacle and regulator at the same angular speed.

6. The combination of a receptacle to contain molten glass having a central outlet opening in the bottom thereof, means to supply glass to said receptacle, means to rotate the receptacle about the vertical center line of said opening as an axis, a cutter mounted to rotate therewith, and means to periodically actuate the cutter and cause it to sever the glass issuing from said outlet.

7. The combination with a receptacle to contain molten glass having an outlet opening in the bottom thereof, means to rotate the receptacle about the vertical center line of said opening as an axis, a regulator projecting downward into the glass in the receptacle over said outlet, means to reciprocate said regulator toward and from the outlet and thereby control the discharge of glass through the outlet, a cutter mounted to rotate with said receptacle beneath said outlet, and automatic means operating in synchronism with the movements of said regulator to periodically actuate the cutter and thereby sever charges of glass issuing from said outlet.

8. The combination with a revolving container for glass, of a revoluble plunger, means to actuate said plunger vertically to form charges of glass, and means operable in synchronism with said plunger movements to sever said charges.

9. The combination of a rotating receptacle to contain molten glass having an outlet opening in the bottom thereof, means to cause a periodic retraction of the glass at the outlet, said means including a plunger mounted within said receptacle, and means to rotate said plunger.

10. The combination of a rotating receptacle to contain molten glass having a outlet opening in the bottom thereof, means including a plunger to cause a periodic retraction of the glass at the outlet, means to rotate said plunger, and means to sever the glass during said retraction.

11. The combination of a continuously rotating receptacle to contain molten glass, means to cause a periodic discharge therefrom at the axis of rotation, and means rotating with said receptacle to sever said discharge.

12. The combination of a rotating receptacle to contain molten glass, a plunger mounted within said receptacle, and means to simultaneously rotate and reciprocate said plunger.

13. The combination with a tank to contain molten glass, of a continuously rotating pot having an outlet in the bottom thereof, means to supply glass from the tank to the pot, a plunger rotating within said pot, and means to reciprocate said plunger.

14. The combination of a container for molten glass having a discharge opening in its bottom, means to supply glass thereto, a regulator working in the glass in the container and controlling the discharge through said opening, and automatic means to rotate said regulator and periodically move it toward and from the opening.

15. The combination of a container for molten glass having a discharge opening, means to supply glass thereto, a regulator working in the glass in the container and controlling the discharge through said opening, and means to rotate and periodically reciprocate said regulator.

16. The combination of a container for molten glass having an outlet opening in the bottom thereof, means to supply molten glass to said container, a regulating plug extending into the glass above said opening, and automatic means to rotate said plug.

17. The combination of a container for molten glass having an outlet opening in the bottom thereof, means to supply molten glass to said container, a regulating plug extending into the glass above said opening, and means to periodically reciprocate said plug vertically and continuously rotate it about a vertical axis.

18. In an apparatus for feeding molten glass, a rotatable receptacle provided with a glass-delivery orifice, a plunger rotatable with said receptacle and reciprocable toward and from said orifice, and means located below said orifice for severing charges of glass delivered therethrough.

19. In an apparatus for feeding molten glass, a rotatable receptacle provided with a centrally disposed glass-delivery orifice, a plunger aligned with said orifice and rotatable with said receptacle, means for periodically reciprocating said plunger while the same is being rotatated, and shears located below said orifice for severing charges of glass delivered therethrough.

20. In an apparatus for feeding molten glass, a rotatable receptacle provided with an orifice located at the center of rotation thereof, a plunger aligned with said orifice, means for rotating said receptacle and said plunger, and means for reciprocating said plunger during its rotation.

21. In means for feeding glass to molds or other containers, the combination of a receptacle adapted to contain a supply of molten glass and provided with an orifice for the discharge of glass to the molds, a reciprocal member working in the glass in relation to said orifice to control the travel of glass therethrough, means for imparting a rotary movement to said receptacle, and means for imparting a rotary movement to said reciprocal member, for the purpose described.

22. In an apparatus for delivering charges of molten glass, the combination of a container having an outlet in the bottom wall thereof through which the glass issues, a regulating device projecting downward into the container and into the glass above the outlet, means to periodically move said device toward and from the outlet for causing an expelling and retarding action on the glass, and means for imparting to said device a movement transverse to its movement toward and from the outlet and transverse to the axis of the outlet and thereby causing a different retarding action than that due to said movement of the regulating device toward and from the outlet.

23. In an apparatus for delivering charges of molten glass, the combination of a container having an outlet in its bottom wall through which the glass issues, a regulating device positioned within the container and projecting into the glass adjacent the outlet and presenting a surface in contact with the glass, means to periodically move said device toward and from the outlet for causing an expelling and retarding action on the glass, and means for imparting a movement to said surface transverse to the axis of the outlet and thereby increasing the retarding action of said device on the glass as said device is moved away from the outlet.

24. The combination of a container for molten glass having a submerged discharge opening, means to supply glass to the container, an implement located and operating within the container and extending into the glass in said container, and means for imparting endwise and rotatable movements to said implement.

25. The combination of a container for molten glass provided with a submerged discharge outlet through which the glass is caused to flow in regulated pulsations, shear mechanism operating to sever the glass discharged from said outlet in synchronism with the pulsations of the discharge, and rotatable and reciprocable means located and operating within the container to move the glass therein at an angle to the line of flow from the outlet to give uniform temperature to the glass discharged.

26. The combination of a container for molten glass provided with a discharge outlet in the bottom thereof, shear mechanism operating periodicaly to sever the glass discharged from said outlet, and rotatable means located and operating within the container to move the glass therein transversely of the line of flow from the outlet and to exert an impelling force to the glass at said outlet.

27. In a device for feeding molten charges of glass, the combination of a melting furnace, a forehearth therefor, a part at the outer end of the forehearth having a submerged discharge orifice, and means mounted for revolution in the glass in the said part and acting by adhesion on the glass to set up rotary motion thereof in said part.

28. In a device for feeding molten charges of glass, the combination of a melting furnace, a forehearth therefor, a part at the outer end of the forehearth having a submerger discharge orifice through which the glass is caused to flow in regulated pulsations, shear mechanism operating to sever the glass discharged from said outlet in synchronism with the pulsations of the discharge, and means mounted for revolution in the glass in the said part and acting by adhesion on the glass to set up rotary motion thereof in said part.

29. The combination of a container for molten glass provided with a submerged discharge outlet, means located and operating within the container to cause the glass to flow in regulated pulsations through the outlet, and to move the glass in the container at an angle to the line of flow from the outlet to give uniform temperature to the glass discharged, said means including a revoluble implement adapted to project downwardly into the glass.

30. The combination of a container for molten glass provided with a submerged discharge outlet, means located and operating within the container to cause the glass to flow in regulated pulsations through the outlet, and to move the glass in the container at an angle to the line of flow from the outlet to give uniform temperature to the glass discharged, said means including a revoluble implement adapted to project downwardly into the glass, and shear mechanism operating to sever the glass discharged from said outlet in synchronism with the pulsations of the discharge.

Signed at Toledo, in the county of Lucas and State of Ohio, this 16th day of December, 1920.

LEONARD D. SOUBIER.